Dec. 26, 1939. W. O. BEYER ET AL 2,184,376
COUPLING DEVICE
Filed June 10, 1937 2 Sheets-Sheet 1
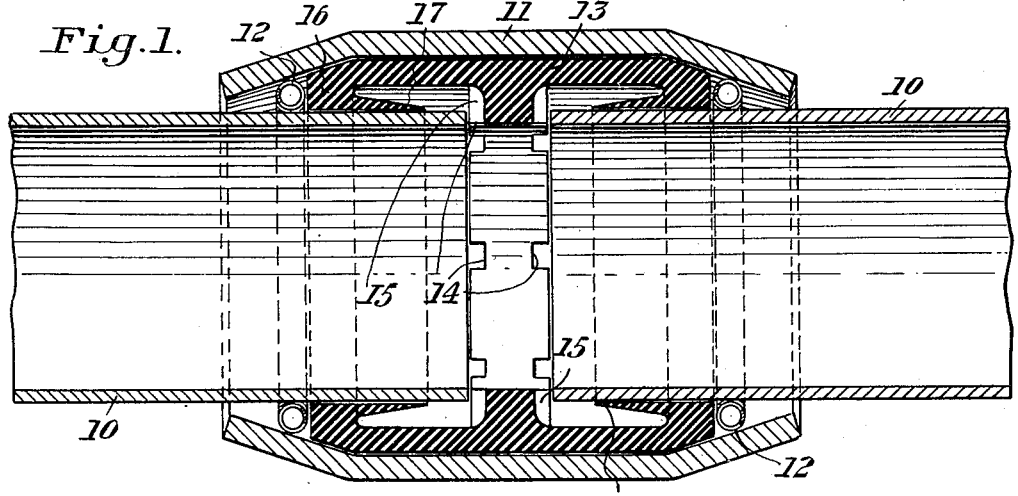
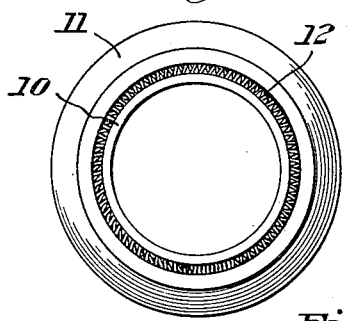
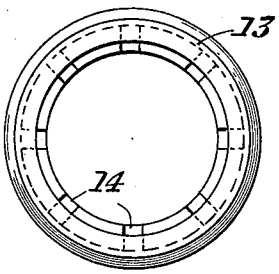
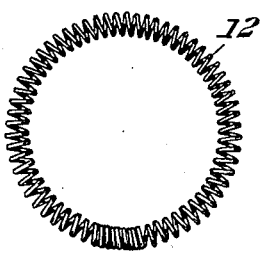
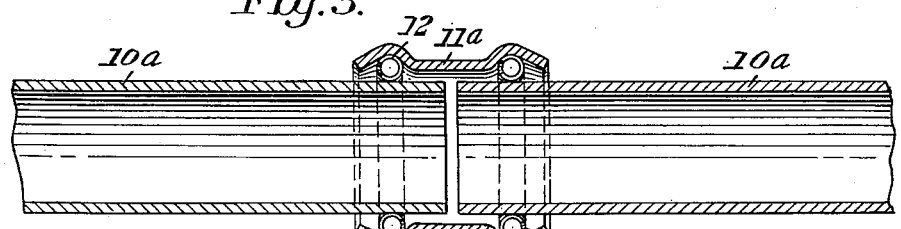
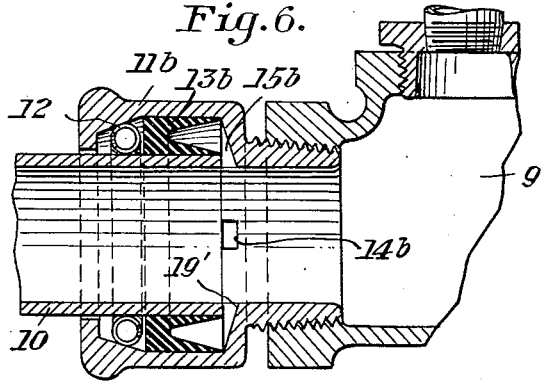
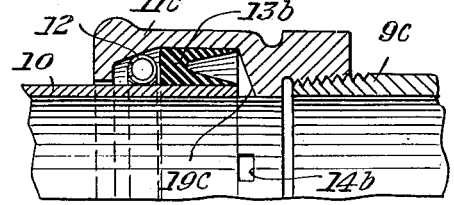
INVENTOR
Walter O. Beyer and Thomas R. Tarn
By Thomas G. Miller
Their attorney Dec. 26, 1939.   W. O. BEYER ET AL   2,184,376
COUPLING DEVICE
Filed June 10, 1937    2 Sheets-Sheet 2
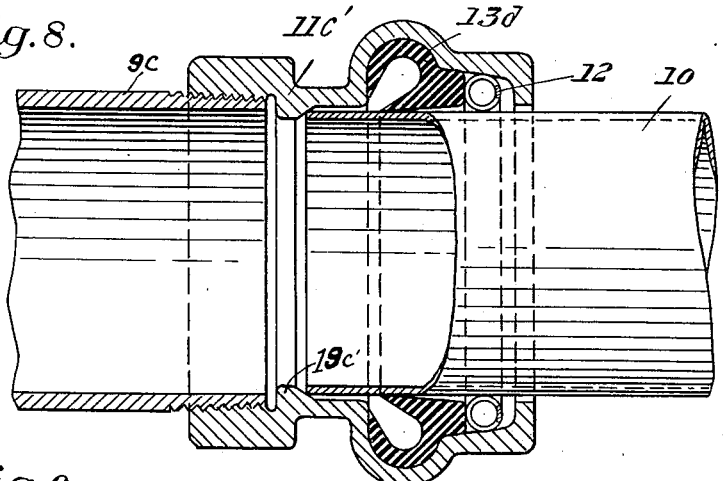
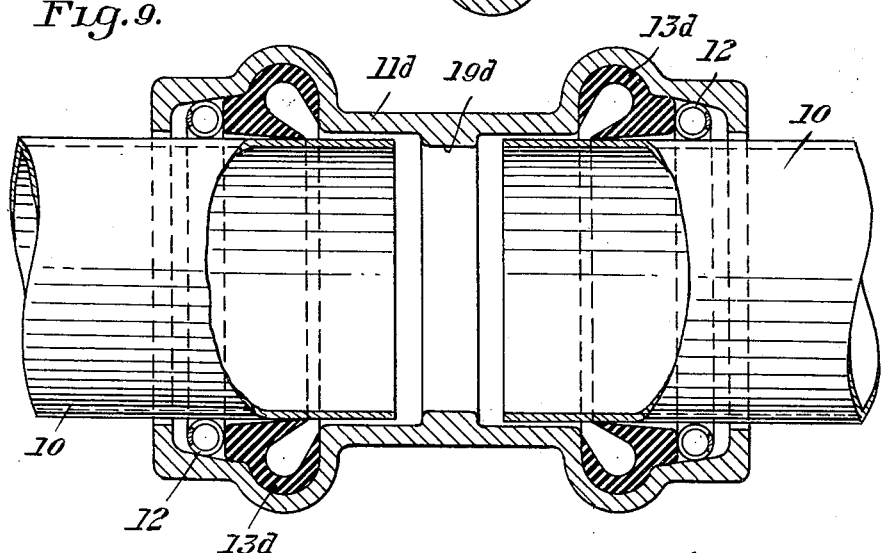
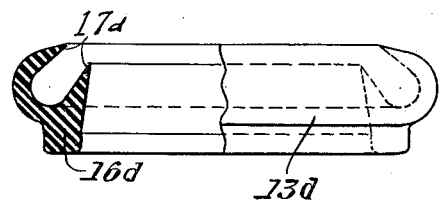
INVENTOR
Walter O. Beyer and Thomas R. Tain
By Thomas G. Miller
Their attorney Patented Dec. 26, 1939

2,184,376

UNITED STATES PATENT OFFICE 2,184,376

COUPLING DEVICE

Walter O. Beyer and Thomas R. Tarn, Pittsburgh, Pa.

Application June 10, 1937, Serial No. 147,411

7 Claims. (Cl. 285—193)

This invention pertains to suitably connecting together and/or holding member sections or lengths, such as pipe sections, shafts, tubes, cables, etc., in a connected relationship, and more particularly, to apparatus therefor.

In one aspect, our invention pertains to attaching or connecting together solid and/or hollow members suitable for shafting, cables, etc., and in another aspect, our invention pertains to connecting and/or holding together members employed for carrying fluids, such as liquids or gases, under various pressure conditions. In both cases, devices or units of our invention may be employed to flexibly and/or detachably connect member sections or lengths.

Previous to the present invention, it has been commercial practice to provide the members that are to be connected together with threads, flanges, and/or bellied or flared portions to facilitate attachment, and to withstand the stresses and strains to which the connection may be subjected.

However, problems of cost, convenience, time, flexibility, adaptability, etc., are presented. For example, there is a certain minimum thickness of wall section necessary for providing threaded connections, regardless of the actual pressure and/or strains to which the section will be subjected; thus, the thickness may be considerably greater than that actually required for the pressure of fluid to be carried.

An ordinary form of connection is relatively rigid and lacks flexibility. When connected sections are to be laid over an irregular contour or are to extend slightly off an axial center, the connected sections, themselves, must give.

We have found that the connections now known to those skilled in the art are not automatic or flexible from the standpoint of holding forces exerted, where, for example, a dead end or closed-off hollow section is connected to a source of fluid pressure. In such a case, the separating force or axial reaction on the pipe section will be directly proportional to the pressure of the fluid contained therein.

In view of the above considerations, it has been an object of our invention to provide new and improved methods of attaching, connecting, and/or holding members in a desired relationship;

Another object of our invention has been to devise a connecting unit that automatically increases its holding effort as a withdrawing effort increases;

Another object of our invention has been to provide apparatus for detachably connecting and/or holding component members together, that is simple, positive, and/or effective in operation;

A further object of our invention has been to devise an arrangement for connecting component members together and holding them in a connected relationship, such that the operation of connecting the component parts or members may be accomplished with a minimum of effort and/or of preparation, and/or such that the component members may in like manner be separated when desired;

A still further object of our invention has been to devise a connecting unit or device for carrying fluids that will automatically increase in fluid sealing effort and/or in holding effort in accordance with an increase of pressure of the fluid;

These and many other objects of our invention will appear to those skilled in the art from the illustrated embodiments, the specification, and the drawings.

In the drawings:

Figure 1 is a longitudinal sectional view through an assembled pair of members connected and held in assembled relationship in accordance with the principles of our invention;

Figure 2 is an end view of the embodiment of Figure 1 showing the external relationship of the arrangement;

Figure 3 is an end view of a sealing ring or pressure-retaining member employed in the embodiment of Figure 1;

Figure 4 is an end view of a clutch annulus element that may be employed in the embodiment of Figure 1;

Figure 5 is a longitudinal section showing a modified assembled coupling arrangement that is particularly suitable for connecting members together where fluid pressure is not encountered;

Figures 6, 7, and 8 are longitudinal sectional views showing what may be termed single coupling arrangements of our invention;

Figure 9 is a longitudinal section through a modified form of double coupling arrangement devised in accordance with the principles of our invention;

Figure 10 is a cross-sectional view of a modified form of sealing ring particularly suitable for use in embodiments of our invention such as shown in Figures 8 and 9.

As previously pointed out, the present invention has two important aspects. The first and simplest of these deals with the provision of a connecting unit or device suitable for holding together a pair of members, such as a pair of shaft sections, in order that they may be used as a single length, and also, in order that requisite results may be obtained. In such a case, the question of sealing off fluid under pressure does not arise. By the terminology "sealing off", we have reference to preventing the escape of fluid adjacent a connection between hollow sections.

We provide a connecting unit or device that will securely hold the sections together, regardless of inward or outward axial forces upon such sections that normally tend to separate them from the device, and thus, with respect to each other. It will be apparent that it is also advisable to provide a connecting device that will enable the sections to be quickly detached and again assembled or connected together, only when desired.

In many cases, it is also desirable to provide a connection that is flexible, or one, in other words, that permits the sections or members to pivot thereabout without actually breaking or losing their connected relationship.

In connecting conduits, pipes, tubing, etc., that are to be employed for carrying fluids, such as liquids and gases under pressure, it will be apparent that provision must be made for sealing off the sections about the connector device, as well as for holding the members in a connected relationship. In this case, a practical form of device for universal application, should, we have discovered, be capable of automatically adjusting itself or compensating for different pressures. The pressure of the fluid flowing through hollow sections will, of course, normally tend to cause leaking, and in addition, to cause the connected sections to separate adjacent the connector device. Thus, the problem in this case is manifold. We have found that the fluid should be held in a sealed relationship with a force that automatically increases as the pressure upon it is increased, and that the sections that contain the fluid should be held in a connected relationship in such a manner that holding effort will automatically increase as the forces increase (fluid or otherwise) that tend to separate the sections.

We have discovered that the above-mentioned problems could be definitely met and that the field of application and/or use of hollow sections, lengths, or members may thus be materially increased. That is, we have been able to devise suitable apparatus that is inexpensive, convenient, time-saving, flexible, adaptable, self-contained, compact, and efficient in operation.

In embodying our invention, we preferably utilize a plurality of suitably-spaced-apart lengths, strut elements, or parts that will positively prevent undesired movement of connected sections as long as force or effort is exerted in certain normal directions or paths. However, the strut elements are also designed in such a manner that they lose their holding strength or withdrawal-resisting qualities where force or the effort is exerted in predetermined desired directions for detaching the connected sections.

In the latter case, direct holding effort or force is resolved into component forces, and thus, is weakened and becomes less effective to an extent sufficient to permit the connected section to be separated or detached.

In a preferred embodiment of our invention, we provide a helix spring grip element of somewhat annular-like or circular form. The element is preferably provided with a plurality of spaced-apart, continuously-connected strut members or elements. However, the spring annulus element may be separated at one end for convenience in manufacture and later intertwined to form a substantially continuous member.

It is felt that the theory of our invention can be better understood by particular reference to illustrative embodiments thereof. Referring to Figure 4, we have shown a preferred form of grip annulus element constructed in accordance with the principles of our invention, and in Figure 5, we have shown a pair of pipe, shaft, cable, or rod sections 10a held in a connected relationship by means of a simple form of device. This arrangement is useful when a "fluid seal" is not required. The device shown includes an outer casing or housing 11a that is bellied-in adjacent its central portion and extends upwardly and then tapers or inclines downwardly at both ends thereof to provide annulus or grooved portions in its inner periphery for receiving a pair of grip elements 12. That is, the ends of the housing 11a are shaped to provide retaining spaces or valleys in the bore for receiving the annular spring elements 12. We preferably slope or taper each end or mouth portion of the housing 11a downwardly in the direction of the pipe section 10a received therein. This provides a wedge-like surface along which the grip members 12 will be pulled when an outward or longitudinal axial pull is exerted on the pipe or rod sections 10a. That is, the normal gripping action of the clutch member 12 will thus be augmented by the automatic wedging action produced when an outward pull is exerted on the member or members 10a. We preferably provide a wedge-like taper adjacent mouth ends of the housing 11a, although a simple form of groove may, in many cases, be sufficient, depending upon the angularity between the adjacent wall surfaces.

The annulus grip member 12 will normally provide a resisting strut action when an attempt is made to move the rod member 10a axially inwardly or outwardly with respect to the housing of the connector 11a. A strut action is obtained provided a suitable retaining wall is furnished, although a tapered or wedge surface aids in increasing the efficiency and effectiveness of the automatic grip action.

As shown, the housing member 11a may be spaced with respect to the pipe sections 10a received therein. This permits each individual section to pivot about its holding grip element 12; the holding action, however, is still maintained, and there is only one practical method of releasing the members 10a, namely, by turning a section 10a about its axis while pulling it outwardly or pushing it inwardly. However, if two connected sections are provided, it is preferable to pull them apart outwardly.

In the embodiment shown in Figure 5, the housing or casing member 11a is provided with clearance between its various portions with respect to the pipe sections 10a. This permits the individual sections to pivot about the grip annulus elements 12. The amount of clearance, of course, will be governed by the desired amount of pivot action between the members 10a. Such pivot action does not materially affect the strut gripping action of the individual spaced portions of the annulus elements 12. Thus, regardless of the angular relationship of the members 10a with respect to the connector device or unit, the holding action will be substantially the same.

The individual convolutions or connected portions of the annulus 12 act as struts when an undesired (substantially axial) withdrawing action or effort is exerted upon the connected sections; the strut action is weakened, or in effect prevented, when a connected section is turned or rotated about its axis, simultaneously with the application of an axial withdrawing effort.

There are three types of contacts; (1) the highest type, namely, a surface contact; (2) the intermediate type, namely, the line contact; and (3) the lower type, or the point contact. In the present invention, we preferably employ a point contact element or member that exerts a holding strut action at a plurality of spaced points about the outer periphery or circumference of the member being held. Of course, the same type of action may be applied to the inner periphery of such a member. The general principles will be the same.

The space point contact relationship, it has been found, provides a highly efficient holding action for resisting undesired withdrawing effort, and also provides a relatively easy, quick, and practical form of slide contact that permits the disconnecting or detaching of members when a desired removing effort is accomplished.

In an annulus of this type, there is a substantially equal distribution of the forces exerted about the convolutions of the spring. The grip annulus or spring 12 is preferably constructed of relatively stiff wire or of some other suitable resilient material that may be distorted within its elastic limits to provide the desired results. The annulus 12 is, in other words, proportioned in stiffness in accordance with the forces to be resisted. It will be apparent that the individual convolutions or connected strut portions of the annulus should be spaced not only centrally of the annulus but also adjacent the inner and outer peripheries thereof. In other words, the annulus should preferably be of a type that is capable of both expansion and contraction.

Where a pipe section is to be gripped on its outer periphery, the annulus is preferably constructed in such a manner that its inside diameter is at least slightly less than the outside diameter of the pipe section. If the pipe section is to be gripped on its inner periphery, the outside diameter of the annulus should be larger than the inside diameter of the section. Thus, in both cases, the adjacent periphery of the annulus 12 is at least slightly expanded and the annulus is placed under compression in the housing of the connector device when a pipe member 10a is inserted therein. The annulus is preferably constructed in such a manner that it fits snugly within the recessed or grooved portion of the connector casing.

In view of such constructions, the individual parts of the spring or annulus 12 can be compressed circularly-axially of the body of such annulus, as well as radially thereof. The individual parts of the element 12, when the element is in its normal holding relationship, constitute a plurality of individual spaced-apart struts that provide point contact between the housing 11a and the pipe sections 10a. These individual struts extend somewhat radially between the inner and outer peripheries of the element, and the element, itself, is capable of a conforming and/or freely accommodating movement in a number of directions.

The individual struts, when a force is exerted upon the members 10a to pull them outwardly or push them inwardly, apply a direct force, such as exerted by a keystone in an arch, such that they maintain the pipe section in axial position. As a result, it is impossible to move the connected sections or members longitudinally or axially in either direction out of the coupling. This is true regardless of whether or not fluid pressure is carried within the members. The coupling housing may be provided with tapered or inclined surfaces in one direction or in both directions, such that the clutch annuluses will be pulled along such wedged surfaces to increase the wedging action thereof, as previously pointed out.

A rotative or turning movement upon the pipe members undermines, keels over, or pushes away the underpinning of the strut members by inclining them out of direct alignment to the forces or effort exerted. The substantially radial individual strut portions thus can only resist a pulling-out movement in an indirect manner, since the direct forces have been resolved into their components. This, of course, weakens the holding action of the annulus and permits it to be compressed annularly to permit the members to be withdrawn.

The annulus element can be constructed in any suitable manner provided its strut or connecting portions are suitably spaced to provide a free accommodating movement, both adjacent the inner and outer peripheries as well as adjacent the various portions of the annulus represented by radii taken therethrough. That is, we utilize the resiliency of the portions of the annulus member within the elastic limits of the material employed in such a manner that no permanent deformation results.

In Figure 1, we have shown a form of arrangement for sealing conduits or fluid-carrying sections as well as for connecting them together. In this arrangement, we have employed a somewhat shell-like housing member 11 having a substantially planar central portion terminating in downwardly inclined or tapered end portions. A sealing gasket or ring 13 is shaped so that it is slightly larger in diameter than the inside of the housing 11, in order that it will fit tightly therein. The washer 13 is preferably constructed of some suitable resilient material, such as rubber, and is provided with a substantially-centrally-located inwardly-projecting shoulder or flange annulus portion that serves as an abutment for the inner edges of the pipe members 10 that are positioned within the connector device. Suitable spaced-apart openings or channel ways 14 are provided adjacent each side of the shoulder annulus and open on each side of the shoulder annulus into pressure chambers 15.

The washer or sealing ring member 13 in effect constitutes an auxiliary housing within the housing 11; the central shoulder portion divides the sealing member 13 into two substantially similar parts. Fluid entering the channel 15 is directed against a feather edge portion 17 that points inwardly towards a similar feather edge portion of the other half of the washer. The feather edge portion 17 is connected to the main body portion through a piston shoulder portion 16. This piston shoulder portion at one end serves as an abutment for a grip element or annulus 12. The element 12, also as shown, abuts against the inner tapered side walls of the housing 11 and against the surface of the pipe section 10 held in place thereby.

In operation, fluid entering the chambers 15 is resolved into substantially horizontal and vertical pressure components. In the position shown in Figure 1, the vertical components will press the feather edge 17 against the pipe section 10 with a sealing action, and the horizontal component will press the piston portion or shoulder 16 against the clutch ring 12. With an increase of pressure, the piston action increases and the sealing action likewise increases. Thus, the piston portion 16 automatically conforms itself to the semi-circular side of the annulus 12 and presses it forward and compresses it against the inwardly-tapered mouth portions of the housing 11.

In Figure 6, we have shown a modified arrangement employing a substantially U-shaped type of sealing member 13b, that has two feather edges, one of which abuts against the housing or casing member 11b, and the other of which abuts against the pipe section 10. Fluid enters the chamber formed by the feather edges through a recess or entry port 14b. The pipe section 10 is prevented from moving axially inwardly by a shoulder portion 19', and, the housing 11b extends inwardly beyond the outer periphery of the pipe section and is threaded to a connector member 9. The connector member 9 may be of any suitable type, such as for spray irrigation.

In Figure 7, we have shown a type of arrangement somewhat similar to that of Figure 6, except that the housing 11c is of the female type and the connector member 9c is of the male type.

In the embodiment of our invention shown in Figure 9, the housing member 11d is provided with a centrally-located flange 19d that spaces the pipe sections 10 that are connected together and prevents their inner edges from abutting against each other. The housing member is provided with recessed or grooved portions adjacent each end thereof for receiving a clutch annulus member 12 and a sealing washer member 13d. The sealing washer member, as shown particularly in Figure 10, is of a somewhat hooked-like shape in section, having a rounded mouth portion terminating at opposite ends in feather edges 17d that abut against the inner wall of the housing 11d and the outer wall of the pipe 10, and are connected together by a pressure shoulder portion 16d. The ring washer member 13d is preferably somewhat larger than the recessed portion of the housing member within which it is to be mounted, and also, its feather edges extend beyond their normal mounted relationship in order that they will resiliently press against the members even when no fluid pressure is exerted, compare Figures 9 and 10. Fluid pressure enters within the chamber of the washer 13d and presses the feather edges 17d into a sealing relationship with the housing 11d and the pipe section 10, while simultaneously elongating the shoulder 16d and pressing it against the annulus 12.

Since rubber is incompressible, although resilient, we have utilized these two qualities to provide the automatic piston action as exerted upon the annulus portions 12. That is, the pressure upon the inside of the washer 13d must elongate the shoulder portion 16d, since the rubber cannot be compressed without elongation.

Figure 8 shows a construction somewhat similar to that of Fig. 7. However, a different shape of housing 11c' and a different type of washer member 13d have been employed. The washer corresponds to the type described in connection with Figure 9.

Many other suitable applications and/or arrangements, of course, will appear to those skilled in the art. That is, the present invention is equally applicable to the specific shapes shown for the purpose of illustrating the invention, as well as to other shapes which may be employed provided the principles of our invention are incorporated therein. Devices or units constructed in accordance with our invention may be adapted and used with any suitable form of connection, such as a T, U, elbow, or angle. They also may be tapped to receive spray connections, such as shown in Figure 6. The longitudinal housing units of Figures 1 and 9 are preferably tapped substantially centrally thereof; in such a case, the washer 13 of Figure 1 will also preferably be centrally "holed out".

We can also eliminate the clearance between the housing members and the pipe sections if the latter are to be securely held without pivoting in their housings. However, as a general rule, it is preferable to provide a housing that permits a certain amount of pivot action, in that the sections may more readily conform to the direction in which they are to carry fluids, and also such that they will conform to the irregular contour of the mount, if any, upon which they rest. Further, the pivot connection relieves the connector unit or device of stress and strain that would otherwise be exerted and that is ordinarily exerted when sections are rigidly connected together.

It may be pointed out that at such times as when no internal pressure is present in the connected sections or tubes 10, and no elongation of the material in the sealing ring is set up to cause the coil spring annulus 12 to exert a wedging action, the locking or wedging of the sections 10 is accomplished by an outward pull on the tubing that, in turn, causes the annulus to move into a contacting or tightly wedged relation with the taper of the housing portion and thereby to increase the holding force.

The present invention is applicable to any suitable form of sections or members that it is desired to connect. It may also be employed to connect together different shapes of members and to hold them and/or seal them on their inner or outer peripheries as desired. Bakelite, steel, copper, iron, aluminum, nickel, asbestos, rubber, and other types of sections may be thus connected.

The present invention makes it possible to employ stiff or non-flexible pipe or rod sections, where it has heretofore been necessary to use flexible hose composed of vulcanized rubber or fabric. For example, in the handling of rockwool insulation, such a type of hose has been employed; it has been necessary in view of the irregular shapes and positions to which the conduits must conform. Such a type of hose has not been entirely satisfactory due to the high frictional loss between the rockwool being carried (a material that is not a fluid, but that is transported as one) and the rubber inner wall of the hose. In a horizontal position, this resistance is very great.

The present type of coupling permits each pipe member that is coupled together to pivot about a point substantially centrally of the clutch annulus 12, and any suitable clearance can be provided between the pipe sections and the walls of the coupling housing to give the desired pivot or bending action. For best results, clearance should be provided adjacent the outer mouth ends of the coupling, as well as adjacent the inner portions thereof.

The present invention has a wide field of use and it broadens the field of application of relatively rigid conduits or pipe sections, such as metal sections, extending their application into the field of flexible hose sections, such as fire hose. That is, suitable arrangements can be employed for irrigation systems, dredging streams, carrying grain in elevators, for cables, conduits, and in all cases where the sections are subjected to considerable pressure and are to be capable of ready detachment.

From the above description of our invention, it will be apparent that we are able to successfully connect and hold together various shapes and/or types of members, regardless of whether or not they are provided with special connecting ends. Further, we have been able to provide a type of device which is relatively simple in construction and which is very practical in application.

The angle of taper between the inside of the housing member and the adjacent pipe section will, of course, govern the wedge action exerted upon the clutch element 12. A certain known angle will result in a gripping pressure through frictional resistance. This frictional resistance that prevents withdrawal of the connected members can be measurably made to exceed the axial reaction upon connected members due to internal hydrostatic pressures by varying or adjusting the angle of taper within certain known limits. This angle also determines the effectiveness of the translation of forces from the pressure of the fluid as accomplished by the piston shoulder portion of the sealing annulus ring or washer. In the drawings, we have designated the angle as alpha. The angle can be computed by known mathematical calculations in accordance with pressures exerted. For example, in the embodiment of Figure 1, we have successfully used an angle ($\alpha$) alpha of 15 degrees in connector units designed to carry about 75 pounds fluid pressure. The translation effects desired will, of course, govern the particular angle selected, as well as the resiliency of the grip annulus, and the size, shape, resiliency and flexibility of the piston washer element.

We preferably employ a plurality of spirally-connected contacts comprising interposed, double-collapsible struts; in other words, the connected portions of the grip element 12 are capable of (1) "keeling over" radially, and of (2) hinging axially (reducing the diameter of the spring).

The unbalanced force represented by the pressure of the fluid in a closed-off hollow section (connected to a fluid source) times the area of the closed-off end is offset by a substantially equal force, represented by the fluid pressure within a resilient ring washer 13, 13b, or 13d, as the case may be, times the pressure-area-portions of the chamber in such ring. The force thus exerted by the pressure shoulder of the ring washer will tend to "balloon" the ring and "roll" outside portions of its shoulder over the adjacent grip element 12, piston-pressing it forward against its tapered recess to increase the wedging action, as the fluid pressure increases. Due to the resiliency of the ring washer, its piston shoulder not only automatically translates fluid pressure into a proportionate wedging and/or gripping force (augmenting the normal gripping action of element 12) but also automatically returns to its initial position (return stroke) when the fluid pressure decreases.

The principles of our invention can also be employed where the connector unit and the pipe sections, in effect, are interchanged in position, in other words, where the housing 11 is to be mounted within hollow sections that are to be connected together. In such a case, recess portions for the washer and grip annulus elements would preferably be on the outer rather than the inner periphery of the connector housing (not shown).

It will be apparent that although we have shown several embodiments of our invention, many additions, subtractions, modifications, arrangements, and/or rearrangements may be made, separately and/or in combination, without departing from the spirit and scope of the invention as indicated in the appended claims. For example, principles of our invention may be employed to prevent the entry of outside fluids into the hollow sections by utilizing pressure-differential sealing elements.

We claim:

1. In a device for holding a member in position with respect to it, a housing having a sloped contact portion, a resilient annulus member having strut elements, said strut elements being constructed and arranged to cooperate with said sloped contact portion and with the member to be held in position, said strut elements having inner and outer peripheral portions, one of said peripheral portions being constructed and arranged to provide a spaced-apart contact with said sloped contact portion, the other of said peripheral portions being constructed and arranged to provide a spaced-apart contact with the member being held, the construction and arrangement of said annulus member being such that said spaced-apart strut elements will tilt when a turning withdrawal force is exerted between said housing and the member.

2. A grip annulus element for holding a member in position with respect to a connector comprising a plurality of spaced-apart strut elements continuously connected in a helical relationship with respect to each other, said element having a peripheral diameter less than the abutting surface of such member; so that the member will be held in a longitudinal axial position by a plurality of circumferentially-spaced frictional point contacts.

3. A grip element for holding a member in position with respect to another member comprising a plurality of spaced-apart strut elements continuously connected in a helical relationship with respect to each other, said grip element having an inner peripheral diameter less than the outer peripheral diameter of the abutting surface of the member to be held, so that the member may be held in a longitudinal axial position by a plurality of circumferentially-spaced frictional point contacts.

4. A device for detachably holding a longitudinal member in position comprising a housing member, means associated with one of said members and having a sloped portion, an annular grip element operably associated with said sloped portion, said grip element being adapted to cooperate with a peripheral surface of the longitudinal member and to detachably hold it in position with respect to said housing, said grip element having portions constructed and arranged to tilt when a turning withdrawal force is exerted on the longitudinal member said grip element having portions constructed and arranged to prevent withdrawal of the longitudinal member when a non-turning force is exerted.

5. A device as defined in claim 4, wherein said grip element has a substantially non-tiltable portion about which other portions may tilt when a turning withdrawal force is exerted.

6. A device for detachably holding a longitudinal section in position comprising a housing, a portion of the wall of said housing being tapered, a flexible grip element operably associated with said tapered portion and with the longitudinal section for holding said section in position with respect to said housing, said grip element having connected spaced-apart convolutions, and being operably mounted in compression between said tapered portion of said housing and the longitudinal section in such a manner that said convolutions will act as individual strut portions when a withdrawal force is exerted on the longitudinal section in a longitudinal direction with respect thereto for preventing an undesired withdrawal of the longitudinal section, said grip element also having closely adjacent convolutions connected to said spaced-apart convolutions, said spaced-apart convolutions being constructed and arranged to tilt about said adjacent convolutions when a turning withdrawal force is exerted on the longitudinal section for permitting a withdrawal of the section.

7. A device for detachably holding a longitudinal section in position comprising a housing, guide means in said housing having a sloped portion, a helically wound annulus and grip element, the sloped portion of said guide means being constructed and arranged to operably position said grip element, said grip element being constructed and arranged to operably engage said sloped portion and to cooperate with a peripheral surface of the longitudinal section to hold the section in position with respect to said housing, said grip element having spaced-apart convolutions over its greater extent and at least one portion along its annular axis having closely adjacent convolutions.

WALTER O. BEYER.
THOMAS R. TARN.